L. SMITH & A. SMITH, Jr.
Mode of and Apparatus for Mashing Grain.
No. 214,724. Patented April 22, 1879.
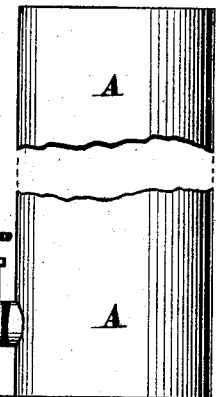
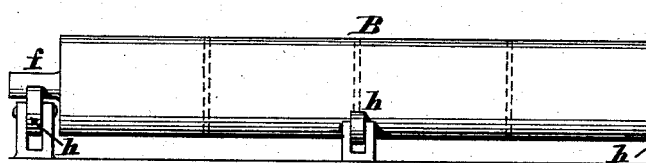
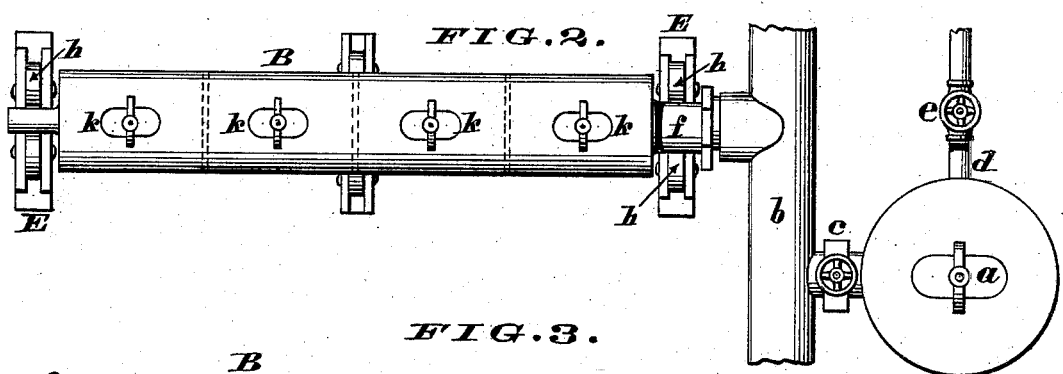
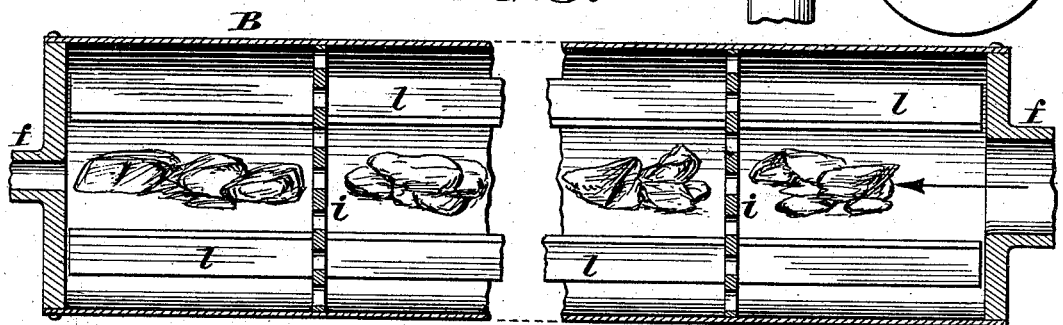
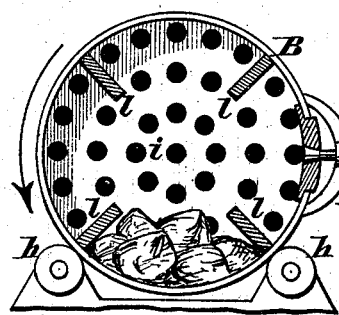
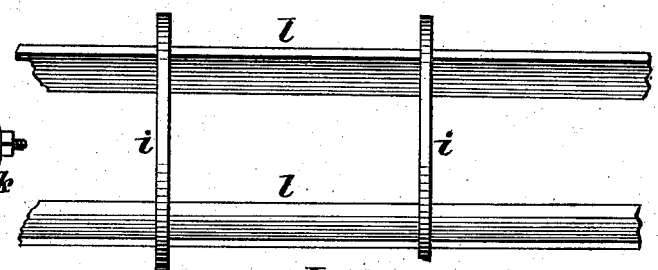

UNITED STATES PATENT OFFICE.

LEANDER SMITH AND AMOR SMITH, JR., OF CINCINNATI, OHIO.

IMPROVEMENT IN MODES OF AND APPARATUS FOR MASHING GRAIN.

Specification forming part of Letters Patent No. 214,724, dated April 22, 1879; application filed January 31, 1879.

*To all whom it may concern:*

Be it known that we, LEANDER SMITH and AMOR SMITH, Jr., both of Cincinnati, in the county of Hamilton and State of Ohio, have invented certain new and useful Improvements in Modes of and Apparatus for Reducing Grain, of which the following is a specification.

Our invention relates particularly to the reduction, by levigation or wet-grinding, of Indian corn or maize for distillers' mash, but is applicable to the reduction of other grain for like purpose, and certain portions of the apparatus may be used for the dry-grinding of these or other substances to obtain food products or fertilizers.

In the preparation of grain for mash it has been heretofore, among other modes, exposed in a close tank or vessel to the direct action of steam under pressure, and when sufficiently softened thereby has been conducted to the reducing or mashing mechanism, located beneath or connected with said vessel. The mass of grain as it comes from the steam-tank is of a soft glutinous nature, increased still more as it is reduced, and it has therefore been necessary to so construct the reducing apparatus that it will itself feed the material forward in the levigating action, or to introduce mechanical appliances for keeping it in progressive motion. Under certain circumstances, also, the direct contact of the steam with the grain has proven injurious, tending to blacken or scorch it.

In our invention, so far as it relates to the reduction into mash, the grain, after having been soaked and softened under pressure in the steam vat or tank, is fed forward through the reducing apparatus still under pressure, and by means of this pressure, which is for this purpose reduced to such degree or so graduated as to give a slower or faster motion to the mass in its passage, and subject it for a longer or shorter time to the levigating action.

In order to give a uniform and homogeneous character to the mash, we reduce the soaked and softened grain by means of a kneading action given by suitable mechanism—that is, by an action which continuously crushes and reincorporates the mass, in manner resembling the kneading of dough.

We also, in order to avoid injuring the grain, have found it advisable to first cover it with water in the steam-tank, this water being of any suitable temperature, and then inducing pressure and raising and maintaining the temperature of the water at the proper degree by steam introduced at any point in the tank above the grain, the water forming a sort of jacket to prevent direct contact of the steam with the grain.

In carrying out our invention we make use of a close tank or vat having a suitable inlet for the introduction of the grain, through which inlet, also, water may be introduced when desirable, and pipes connecting one with apparatus for supplying steam under pressure, and the other with the reducing or levigating mechanism. Both pipes are furnished with suitable cocks.

Connection with the reducing mechanism having been shut off, the grain is placed in this tank and covered with water. Steam is then turned on at a pressure ranging from about ten to about thirty pounds to the square inch, which limits may, however, be exceeded, and the grain is left to soak for from about ten to about twenty hours, depending upon its condition and the degree of steam-pressure. The water envelope is stationary, serving to prevent contact of the grain with the steam, while the pressure of the steam prevents ebullition in the water, which would break and otherwise injure the grain. When the grain is soft enough to mash, the connection with the reducing mechanism is opened, and the mass allowed to feed gradually therein, the steam-pressure being at this moment reduced to a few pounds to the square inch, or to such degree that the soft grain will be propelled slowly, and submitted for a sufficient time to the action of the levigators, which time may be greater or less, according to the condition of the grain and the quality of the product.

A desirable form of reducing apparatus for use in connection with this mode of feeding the softened grain consists in a drum having balls or pieces of metal inclosed, which, as the drum is caused to rotate, successively rise with the rotation and fall back to the bottom, tumbling or rolling over each other, and acting with a kneading or levigating effect upon the material to be reduced, this continuous kneading and incorporating of the moist substance giving it a more uniform and homogeneous and even character.

In order to hold the grain for a sufficient time under the action of the balls or weights, and to restrain these from moving with the lengthwise current, we divide the drum into compartments by means of one or more perforated diaphragms, and place a number of balls or weights within each compartment, the perforations in the diaphragms being sufficiently small to confine these balls or weights within their respective compartments, but of such size as to permit the passage of the material to be treated from one compartment to another. There may be any desirable number of these diaphragms, and at any suitable distance from each other. In practice they should be placed not more than three or four feet apart, and may be placed much closer together.

To further increase the action of the balls or weights, we provide the drum with a number of longitudinal inwardly-projecting flanges or ribs, the effect of which is to carry the contents of the drum to a higher point in its revolution before their fall back to the bottom, and to keep them in more active motion and the material under treatment more thoroughly commingled. The grain to be reduced enters this drum from the steam-tank through a hollow trunnion, with which the feed-pipe connects, and is carried slowly through the successive compartments as the drum rotates by the propelling effect of the steam-pressure.

Grain and other substances may also be ground dry in this drum by substituting a dry blast or pressure for the steam blast or pressure to force the material through the successive compartments and diaphragms, and controlling this blast or pressure according to the fineness of the product desired.

The construction and operation of our apparatus will be more fully understood by reference to the accompanying drawings, in which—

Figure 1 is a side elevation; Fig. 2, a plan view; Fig. 3, a longitudinal section of the drum; Fig. 4, a cross-section thereof; and Fig. 5, a detail.

A is the tank or receptacle for the grain, formed of metal, and of sufficient strength to withstand a pressure of several atmospheres. Suitable provision is made for the introduction of the grain by means of a mouth or aperture, $a$, to which is fitted a close cap, adapted to be screwed down or otherwise secured to prevent the escape of air or steam. At the bottom of the tank a pipe, $b$, having a suitable stop-cock, $c$, connects with the reducing apparatus or drum B. This pipe is shown as formed with elbow or angular joints; but, in order to prevent clogging, it will be advisable to make it straight, or, where an indirect course is necessitated, to form it with bends or gradual curves. Another pipe, $d$, near the head of the tank, leads to the apparatus for inducing pressure or supplying steam.

This pressure or steam mechanism may be of any of the ordinary constructions suitable to the end, and in itself forms no part of our invention.

The pipe $d$, connecting the pressure or steam apparatus with the tank, is fitted with a stop-cock, $e$, whereby the current may be cut off or diminished at will.

In Figs. 3, 4, and 5 is shown the reducing apparatus which we have invented, and deem preferable for use in connection with the hereinbefore-described process.

B is a drum of considerable length, having at its ends trunnions or journals $f$ $f$, resting in bearings or rolling supports upon suitable brackets or standards E E. This drum may be supported at various points along its length and prevented from sagging by antifriction rolls or wheels $h$ $h$, arranged in pairs or alternately beneath it. Within the drum we place one or more perforated diaphragms, $i$, dividing it transversely into compartments, the interior of which may be reached by manholes $k$, one to each compartment.

A number of balls or weights, of metal or other hard and ponderous material, and of greater diameter than the perforations in the diaphragms, are placed in each of these compartments, and serve to reduce the material passing through by their action as the drum rotates, but are restrained within their proper section or compartment against the propelling action of the material under pressure by the transverse diaphragms.

A number of longitudinal inwardly-projecting flanges or ribs, $l$, are bolted or otherwise secured to the inner surface of the drum, and by carrying the contents to a higher point in the revolution before their fall serve to increase the action of the balls or weights, and keep the material more forcibly agitated. These flanges or ribs may run the entire length of the drum, or be broken at intervals, or may be placed in certain compartments while others have none.

The corn, grain, or other material to be reduced is fed into the drum through one of the journals, which is hollow, and may be discharged at the other end, after being mashed or comminuted, through a man-hole or other opening at or near the end, or perforations in such end, or through the journal at that end which, for this purpose, is also made hollow.

The drum is caused to rotate by cog-gearing or belt, and for this purpose one or more pinions or pulleys may be fixed at any point of its length or to either of the journal-shafts.

It may be desirable, when the drum is used for levigating or reducing to mash, to connect it by branching pipes with a number of steam-tanks, in which the grain is in various states of preparation, each tank having its appropriate stop-cock, whereby as the contents of one are being reduced the contents of another may reach the proper condition for mashing, and the reducing operation thereby be kept up continuously until the desired quantity of mash has been obtained.

The arrangement shown in Fig. 2 of the drawings is calculated for this purpose, the main feed-pipe being continued and connected at suitable points along its length with branch pipes leading to the individual tanks A. The same object can be attained by arranging a number of tanks in the arc of a circle, and so mounting the drum that the ingress end may be swung from one to the other, and coupled to or uncoupled from its delivery-pipe at will, the arc being concentric with the axis of a beveled driving-gear at the exit or delivery end.

When the apparatus is used for reducing corn and other grain into mash, the pipe $d$ of the tank connects with apparatus for supplying steam under pressure. After the grain is sufficiently softened, and at the moment when connection between the drum and tank is opened, this pressure is reduced, as heretofore stated, in order to simply propel the material through the drum, and pass it under the successive action of the balls or levigators in each each compartment. The speed with which it is propelled may be determined at will by graduating the steam-pressure.

In dry-grinding, the pipe $d$ may be connected with apparatus for inducing air-pressure, or a blast of air, of sufficient strength to take up and carry on the comminuted particles. This air blast or pressure will act precisely as the steam blast or pressure, except that it will not have the dampening effect of the latter, and that the material upon which it acts will not have the cohesiveness of the mash. The grain or other material may be introduced into the drum by other appliances than the tank, and the air-blast applied directly to the inlet end, so as to take the material in the first compartment, or in the throat of the hopper or inlet.

In dry-grinding, also, the action of the comminuting or triturating mechanism and of the air-blast may be aided and the effect in some cases improved by making the perforations in each successive diaphragm greater in number and of lesser diameter than in the preceding, thus determining in some measure the size of the particles passing from each compartment into the succeeding; and, moreover, it is not so necessary when pulverizing or triturating a dry substance that the diameter of the balls should exceed that of the perforations, since their liability to be pushed from one compartment to another is much lessened.

It is obvious that the mode of propelling the softened grain through the reducing mechanism by means of steam-pressure may be used in connection with any mode or means for soaking or softening it, and also that the mode of soaking the grain in a water-jacket under heavy steam-pressure may be used in connection with subsequent reduction by any suitable levigating apparatus.

What we claim as our invention is—

1. In mashing grain, the process of reducing the grain to a homogeneous mass, consisting in first dampening and softening the grain, and then crushing and commingling it by subjecting it to a prolonged kneading action, substantially as described.

2. In mashing grain, the mode of determining the grade or homogeneity of the resultant mass, consisting in controlling the passage of the dampened and softened grain under the action of the mashing mechanism by graduation of the steam-pressure.

3. In mashing grain, the process of reducing the grain to a homogeneous mass, consisting in dampening and softening it under heavy pressure, and then subjecting it, under a propelling pressure, to the kneading and mashing action of balls or levigating weights within a rotating drum.

4. In mashing grain, the mode of preventing scorching and breaking of the grain, consisting in soaking and softening it in a stationary envelope of water under steam-pressure, the steam being in direct contact with the surface of the water.

5. The combination of the close tank, a pressure apparatus, the rotary drum, and the balls or weights within such drum.

6. The combination of the close tank, an apparatus for supplying steam under pressure, the rotary drum, and balls or weights within such drum.

7. The combination, with the tank for soaking or softening grain, of a rotary drum having balls or weights inclosed, and a feed-pipe connecting the tank and drum.

8. The combination, with the tank for soaking and softening grain, of the rotary drum, its balls, the hollow journal, and the feed-pipe, connected at one end to said journal and at the other to the tank.

9. The combination, with a single reducing apparatus, of a series of steam-tanks, each with its appropriate delivery or discharge pipe and stop-cock therein, whereby as the contents of each tank are mashed the contents of another may, in succession, be brought to the proper condition for mashing, substantially as described.

10. The rotary drum having one or more perforated partitions or diaphragms and balls or weights in the compartments formed by such diaphragms.

11. The rotary drum having one or more perforated partitions or diaphragms, forming compartments for the reception of balls or weights, and a man-hole to each compartment.

12. The rotary drum having one or more perforated partitions or diaphragms, forming compartments, an inlet at one end and an exit passage at the other end.

13. The rotary drum having one or more perforated partitions or diaphragms, balls or weights inclosed within the compartments thereby formed, and hollow journals at each end, through which the material to be reduced is received and delivered.

14. The rotary drum having perforated transverse partitions or diaphragms and longitudinal internal ribs or flanges, substantially as described.

15. The rotary drum having perforated transverse partitions or diaphragms, longitudinal internal ribs or flanges, and balls or weights inclosed in the compartments formed by the diaphragms.

16. The combination of the rotary drum having perforated diaphragm or diaphragms, balls or weights within the compartments of the drum, and pressure apparatus for inducing a current therethrough from the inlet toward the exit passage.

17. The combination of the rotary drum having perforated diaphragm or diaphragms, balls or weights within the compartments of the drum, and steam-pressure apparatus for propelling the material under treatment successively from one compartment to another until it reaches the delivery-spout.

18. The combination of steam-pressure apparatus, the tank, the rotary drum with its perforated diaphragm or diaphragms, and balls or weights within the compartments of the drum of greater diameter than said perforations.

19. The combination of the tank, the delivery or feed pipe, the rotary drum with its perforated diaphragm or diaphragms, and balls or weights within the compartments of the drum of greater diameter than said perforations.

20. The combination, with the rotary drum having perforated diaphragm or diaphragms, of balls or weights within the compartments formed by such diaphragm or diaphragms of greater diameter than the perforations therein.

LEANDER SMITH.
AMOR SMITH, Jr.

Witnesses:
ERNEST H. RYDALL,
DANL. KELLY.